US011237288B2

(12) United States Patent
Hornby et al.

(10) Patent No.: US 11,237,288 B2
(45) Date of Patent: Feb. 1, 2022

(54) VERIFYING MEASUREMENTS OF ELASTIC ANISOTROPY PARAMETERS IN AN ANISOTROPIC WELLBORE ENVIRONMENT

(71) Applicant: Halliburton Energy Services, Inc., Houston, TX (US)

(72) Inventors: Brian E. Hornby, Katy, TX (US); Ruijia Wang, Singapore (SG); Kristoffer Walker, Kingwood, TX (US); Mark Collins, Spring, TX (US); Joonshik Kim, Singapore (SG); Baichun Sun, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 806 days.

(21) Appl. No.: 15/542,782

(22) PCT Filed: Mar. 16, 2017

(86) PCT No.: PCT/US2017/022702
§ 371 (c)(1),
(2) Date: Jul. 11, 2017

(87) PCT Pub. No.: WO2017/172371
PCT Pub. Date: Oct. 5, 2017

(65) Prior Publication Data
US 2018/0164463 A1 Jun. 14, 2018

Related U.S. Application Data

(60) Provisional application No. 62/315,271, filed on Mar. 30, 2016.

(51) Int. Cl.
*G01V 1/50* (2006.01)
*G01V 1/48* (2006.01)
(Continued)

(52) U.S. Cl.
CPC .............. *G01V 1/50* (2013.01); *E21B 47/002* (2020.05); *E21B 49/00* (2013.01); *G01V 1/48* (2013.01);
(Continued)

(58) Field of Classification Search
CPC . G01V 1/50; G01V 1/48; G01V 1/306; G01V 2200/14; G01V 2200/16;
(Continued)

(56) References Cited

U.S. PATENT DOCUMENTS

| 6,714,480 B2 | 3/2004 | Sinha et al. |
| 2004/0001389 A1 | 1/2004 | Tang et al. |

(Continued)

FOREIGN PATENT DOCUMENTS

WO 2014000815 1/2014

OTHER PUBLICATIONS

NPL_782 Search Results, May 19, 2021, 1 pp. (year: 2021).*
(Continued)

*Primary Examiner* — Toan M Le
*Assistant Examiner* — Xiuqin Sun
(74) *Attorney, Agent, or Firm* — Kilpatrick Townsend & Stockton LLP

(57) ABSTRACT

A portion of an anisotropy formation through which a wellbore is formed can be identified. An estimate of an elastic anisotropy parameter for the portion can be adjusted based on a first quality control analysis using the elastic anisotropy parameter for the portion. The first signal representing the elastic anisotropy parameter for the portion. The estimate of the elastic anisotropy parameter for the portion can be adjusted based on a second quality control analysis using estimates for the elastic anisotropy parameters for two or more portions of the anisotropy formation.

20 Claims, 15 Drawing Sheets

```
Identify a portion of an anisotropy formation through which a
                    wellbore is formed
                                                    140

Adjust an estimate of an elastic anisotropy parameter for the
portion based on a first quality control analysis of a first signal
                                                    150

Adjust the estimate of an elastic anisotropy parameter for the
portion based on a second quality control analysis of a second
                         signal
                                                    160
```

(51) Int. Cl.
*E21B 47/002* (2012.01)
*E21B 49/00* (2006.01)
*G01V 1/30* (2006.01)
*E21B 43/26* (2006.01)

(52) U.S. Cl.
CPC .............. *E21B 43/26* (2013.01); *G01V 1/306* (2013.01); *G01V 2200/14* (2013.01); *G01V 2200/16* (2013.01); *G01V 2210/586* (2013.01); *G01V 2210/626* (2013.01); *G01V 2210/6222* (2013.01); *G01V 2210/72* (2013.01)

(58) Field of Classification Search
CPC ..... G01V 2210/586; G01V 2210/6222; G01V 2210/626; G01V 2210/72; E21B 47/0002; E21B 49/00; E21B 43/26
USPC .......................................................... 702/11
See application file for complete search history.

(56) References Cited

U.S. PATENT DOCUMENTS

| | | | |
|---|---|---|---|
| 2008/0144439 A1 | 6/2008 | Plona et al. | |
| 2012/0283951 A1 | 11/2012 | Li et al. | |
| 2012/0316789 A1* | 12/2012 | Suarez-Rivera | E21B 49/00 702/13 |
| 2014/0149040 A1 | 5/2014 | Omeragic | |
| 2015/0049585 A1* | 2/2015 | Collins | G01V 1/50 367/35 |
| 2015/0160368 A1 | 6/2015 | Renli et al. | |
| 2015/0309200 A1* | 10/2015 | Zharnikov | G01V 1/48 702/11 |
| 2018/0216441 A1* | 8/2018 | Gu | E21B 43/26 |
| 2020/0393587 A1* | 12/2020 | Hornby | G01V 1/306 |

OTHER PUBLICATIONS

OnePetro_782 search Results, May 19, 2021, 1 pp. (Year: 2021).*
Google_Search_Results, May 19, 2021, 1 pp. (Year: 2021).*
Halliburton Energy Services , "Xaminer Sonic Service brochure", Available online at http://www.halliburton.com/public/lp/ contents/Data_Sheets/web/H/Xaminer-Sonic-Service.pdf,, Sep. 2015, 2 pages.
International Patent Application No. PCT/US2017/022702 , "International Search Report and Written Opinion", dated Jun. 26, 2017, 17 pages.
TANG , "Determining formation shear-wave transverse isotropy from borehole Stoneley-wave measurements", Geophysics, vol. 68, No. 1, 2003, pp. 118-126.

* cited by examiner

VERIFYING MEASUREMENTS OF ELASTIC ANISOTROPY PARAMETERS IN AN ANISOTROPIC WELLBORE ENVIRONMENT

CROSS-REFERENCE TO RELATED APPLICATIONS

This disclosure is related to and claims the benefit of priority of U.S. Provisional Application No. 62/315,271, titled "Work Flow and QC Displays for Estimating Formation Shear and Mud Slowness in an Anisotropic Wellbore Environment" and filed on Mar. 30, 2016, which is hereby incorporated in its entirety by this reference.

TECHNICAL FIELD

The present disclosure relates generally to detecting downhole signals. More specifically, but not by way of limitation, this disclosure relates to verifying measurements of elastic anisotropy parameters in a wellbore environment.

BACKGROUND

A well (e.g., an oil or gas well for extracting fluid or gas from a subterranean formation) can include various well tools positioned in a wellbore. Well tools can perform various functions in a wellbore, including determining information about the surrounding subterranean formation. For example, some well tools can transmit acoustic signals to perform seismic imaging of the surrounding subterranean formation. In some wells, the well tools can wirelessly communicate data and instructions with devices on the surface. Characteristics of the wellbore environment can affect signals (e.g., the wireless signals for communicating with the surface or the acoustic signals for seismic imaging) as the signals propagate through the wellbore environment.

DETAILED DESCRIPTION

Figure 1:
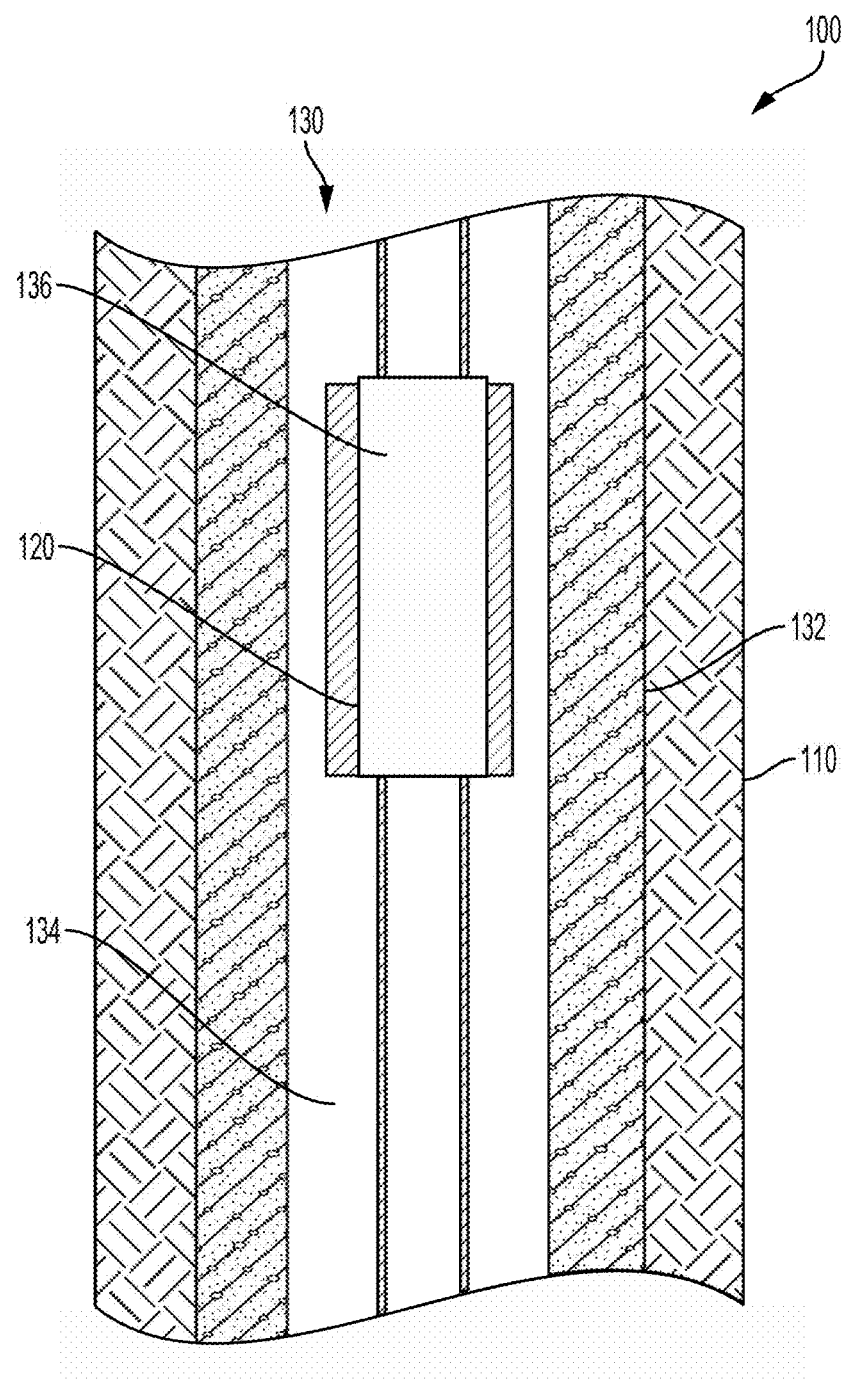
FIG. 1 is a cross-sectional view of an example of a well system with a well tool positioned in a wellbore according to one aspect of the present disclosure.

Certain aspects and features of the present disclosure relate to improving estimates of elastic anisotropy parameters (e.g., propagation characteristics of wireless signals) of an anisotropic wellbore environment. A medium through which a wireless signal propagates can effect a speed at which the wireless signal propagates and the amount or type of distortion experienced by the wireless signal. A system can perform a local quality control analysis at different portions of a wellbore and a whole wellbore quality control analysis to verify an estimate of the elastic anisotropy parameters for the wellbore. Verifying the estimate of the elastic anisotropy parameters for the wellbore can improve a signal-to-noise ratio of signals received by (or from) well tools positioned in the wellbore. The local quality control analysis can include adjusting the estimate such that data extracted from signals received at discrete portions in the wellbore are within a threshold value of actual data from which the signals were generated. The whole wellbore quality control analysis can include adjusting the estimate based on analysis of data extracted from signals received at several different portions in the wellbore.

Subterranean formations can exhibit anisotropic characteristics such that the propagation speed of an acoustic wave can vary with the propagation direction of the acoustic wave. Some of the geological formations encountered during well drilling are layered and relatively isotropic in the horizontal plane with a propagation speed that is faster than in the vertical direction. This type of anisotropy can be considered vertical transverse isotropy ("VTI") because these formations can have a symmetry axis such that along any direction transverse to the axis, the same elastic material properties (e.g. wave speed) can be observed. Accurate information about the anisotropy in a well can be important for accurate communication of signals downhole. For example, precise estimations of elastic anisotropy parameters for acoustic waves traveling through a subterranean formation can be important for calculating reservoir seismic images of the subterranean formation. In other examples, understanding the contribution of VTI anisotropy to anisotropic measurements in horizontal wells can be important for determining the optimum direction for hydraulic fracturing purposes. In still other examples, VTI anisotropic measurements can yield important information regarding lithologies, fracture densities, and stress that can be useful for formulating a production strategy that maximizes the reservoir's economic value.

Acoustic measurements can be used to obtain formation VTI measurements around the wellbore. In some aspects, a quality control ("QC") process can help to extract such information as accurately as possible. For example, the system can include QC processes for determining vertical propagating shear-wave slowness, mud slowness, and the Thomsen Gamma anisotropy parameter ("γ"). The QC processes for determining these characteristics can be useful because these characteristics can be generated by measurable signals in two different sources of recordings: the Stoneley ("ST") wave and flexural ("FL") wave dispersion curves. ST waves (or tube waves) can travel along an interface between mud in the wellbore and the subterranean formation. Particle motion in a ST wave can be parallel to the axis of the wellbore. FL waves can have a particle motion that is perpendicular to the axis of the wellbore. There are a variety of influences that can make the detection of the ST waves and FL waves challenging, including wellbore irregularities, tool effects, tool centralization, modally impure sources, and transmitter and receiver mismatching.

In some aspects, VTI analysis can be used to extract vertical propagating shear-wave slowness and γ. Acoustic-wave arrivals can be used to obtain these two acoustic properties from sonic measurements. For example, a procedure can be used to estimate the vertical propagating shear-wave slowness from FL waves, and shear slowness anisotropy from low-frequency wellbore ST waves, respectively. Some mud slowness and anisotropy estimating processes are performed by a time-based or frequency-based coherence processing. These processes can use a semblance coherence maps as QC indicators of the accuracy of the VTI measurements. The coherence map can be robust and reliable, but a process may not be sufficient for accurately checking the quality of the measured VTI parameters. Some factors, including error in the wellbore radius, mud slowness, mud density, or an assumption regarding the presence of invasion and alteration zones, can change the effectiveness of some QC processes. In some aspects, a more expansive QC process can be used to determine the reliability and trustworthiness of the VTI processing results.

One of the sources of error in the inputs to VTI processing can be mud slowness. Mud slowness can be the amount of time for a wave to travel a certain distance through mud (e.g., drilling fluids) proportional to the reciprocal of a velocity of the wave. Mud slowness can be used for a variety of inversion-based algorithms to process acoustic logging data because mud slowness can strongly affect the ST and FL dispersions for both fast and slow formations. The system can invert mud slowness logs from sonic logging data.

In some aspects, the system can perform an accurate joint inversion of shear slowness and Thomsen parameter γ by fitting FL and ST dispersion curves simultaneously. The system can accurately monitor the correctness and accuracy of vertical propagating shear-wave slowness and anisotropy to determine that VII processing results meet an acceptable standard. The system can provide the reasons when the VII processing fails to obtain reliable results, and can guide a user to adjust processing parameters correctly. In some aspects, the system can also be applied to logging-while-drilling ("MD") VTI processing by using screw waves and ST waves. Screw waves (or quadrupole waves) can be a dispersive wave mode guided along a wellbore by a drill collar. In some aspects, the system can be implemented in substantially real-time processing algorithms such that the system can verify measurements of elastic anisotropy parameter at substantially the same time as a wellbore operation (e.g., a drilling operation).

These illustrative examples are given to introduce the reader to the general subject matter discussed here and are not intended to limit the scope of the disclosed concepts. The following sections describe various additional features and examples with reference to the drawings but, like the illustrative aspects, should not be used to limit the present disclosure.

FIG. 1 is a diagram of an example of a well system 100 with a well tool 120 positioned in a mud-filled wellbore 130 formed through a VTI formation 110. The wellbore 130 can extend from a surface of the earth through various earth strata, including the VTI formation 110 from which hydrocarbons may be extracted using wellbore operations. A portion of the wellbore 130 can include a cement casing 132 providing support to the wellbore 130. A tubing string 136 can extend from the surface through a portion of the wellbore 130. In some aspects, the tubing string 136 may include segmented pipes and provide a conduit through which formation fluids, such as hydrocarbons produced from the VTI formation 110, may travel in the wellbore 130 to the surface. In additional or alternative aspects, the wellbore 130 can include mud 134 between the cement casing 132 and the tubing string 136. The well tool can be coupled to (or included in) the tubing string 136 and positioned in the wellbore 130.

Figure 2:
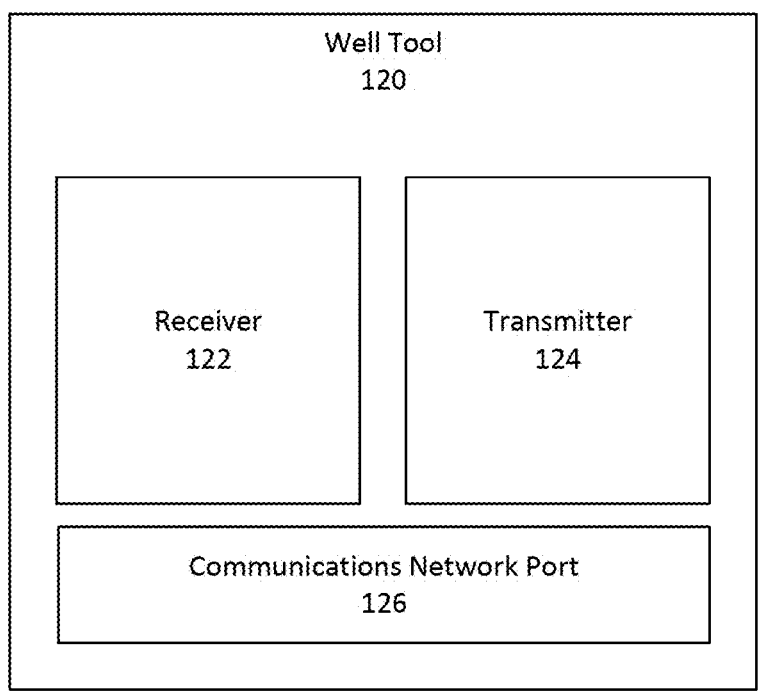
FIG. 2 is a block diagram of an example of a well tool for verifying measurements of elastic anisotropy parameters in an anisotropic wellbore environment according to one aspect of the present disclosure.

FIG. 2 is a block diagram of an example of the well tool 120 in FIG. 1. In some aspects, the well tool 120 can include a receiver 122 for receiving a signal and for extracting information from the signal. The well tool 120 can also include a transmitter 124 for performing seismic-imaging by transmitting a signal and then extracting information from a received reflected signal. In some aspects, the well tool 120 can include a communications network port 126 for communicatively coupling to a processing device. In additional or alternative aspects, the well tool 120 can include a processing device. The processing device can determine the extracted information is unreliable and that an estimate of a propagation characteristic of the VTI formation 110 is inaccurate. The processing device can further calculate adjustments to improve the estimate and increase the reliability of information extracted from subsequent signals.

The effects of the well tool 120 in the measured wellbore response can be simplified and expressed as a radial 1D equivalent tool model ("ETM"). This wellbore response, or the dispersion characteristics of each recorded seismo-acoustic wave, can be numerically forward-modeled by the general "characteristic" or "dispersion" equation, $$D(T, \rho_m, s_m, \rho_f, s_f^{PV}, s_f^{SV}, \gamma, \delta, \varepsilon) = 0,$$

where T denotes the ETM parameter(s); $\rho_m$ and $s_m$ represent mud density and compressional slowness, respectively; $\rho_f$ denotes formation density; $s_f^{PV}$ and $s_f^{SV}$ represent formation vertical propagating compressional wave slowness and shear-wave slowness, respectively; and $\gamma$, $\delta$ and $\varepsilon$ are Thomsen anisotropic parameters. For field data processing, the ETM can be determined by the combination of the well tool 120 properties within the geophysical environment surrounding the wellbore 130. Mud compressional slowness $s_m$ and density $\rho_m$ can be estimated by the mud type used in the well system 100. $s_f^{PV}$ can be estimated by array processing of monopole refracted compressional or leaky P waves. $s_f^{SV}$ can be estimated by array processing of wellbore FL waves. Thomsen parameter $\gamma$ can be assumed to only be sensitive to horizontal shear, and consequently $s_f^{SV}$ can be extracted from low-frequency ST waves while Thomsen parameter $\varepsilon$ and $\delta$ can be assumed to be equal to $\gamma$ and 0, respectively.

A joint inversion of vertical propagating shear-wave slowness and anisotropy $\gamma$ based on observed ST and FL wave dispersion curves can be a robust process for extracting the VTI parameters. Generally, such processes can be performed by minimizing the difference of modeled data and measured data, which can be detailed in the misfit function, $$M(\gamma, s) = \sum_{FL,f} [S_{FL}^{model}(f, \gamma, s) - S_{FL}^{measure}(f)]^2 + \sum_{ST,f} [S_{ST}^{model}(f, \gamma, s) - S_{ST}^{measure}(f)]^2,$$

where $S_{FL}^{model}$ (f, $\gamma$, s) and $S_{ST}^{model}$ (f, $\gamma$, s) represent forward-modeled FL and ST dispersion curves, while $S_{FL}^{measure}$ (f) and $S_{ST}^{measure}$ (f) denote measured FL and ST dispersion curves. An adaptive weighting function, $$M(\gamma, s) = \sum_{FL,f} [S_{FL}^{model}(f, \gamma, s) - S_{FL}^{measure}(f)]^2 W_{FL}(f) + \sum_{ST,f} [S_{ST}^{model}(f, \gamma, s) - S_{ST}^{measure}(f)]^2 W_{ST}(f),$$

can also be included in the processing to weigh preferentially more reliable frequencies. Where, $W_{ST}$ (f) and $W_{FL}$ (f) are the weighting functions for the ST and FL dispersion curves, respectively. In some aspects, the adaptive weighting function can be helpful when measured dispersion curves undulate wildly from one frequency to the next due to low signal-to-noise ratio. The above VTI inversion process can be suitable for wireline logging ("WL"). A similar misfit function of the VTI processing can be implemented using a combination of screw and ST waves, instead of FL and ST waves, for LWD applications.

A global minimum search process over a grid of trial $\gamma$ and shear slowness $$M(\gamma, s) = \sum_{FL,f} [S_{FL}^{model}(f, \gamma, s) - S_{FL}^{measure}(f)]^2 W_{FL}(f) + \sum_{ST,f} [S_{ST}^{model}(f, \gamma, s) - S_{ST}^{measure}(f)]^2 W_{ST}(f),$$

over the misfit function can be utilized, which in return can quantitatively produces the optimum results of vertical shear slowness and anisotropy, min $\{M^{(\gamma, s)}\}$.

This VTI inversion can be limited by the appropriateness of the modeled dispersion curves. Other factors that are not modeled may influence the observed dispersion curves including wellbore washout, invasion zone, and stress concentration on wellbore sidewall. Additionally, during VTI processing, parameters such as wellbore radius, formation density, and mud density can be constrained directly or indirectly by other tools that have limited accuracy and capability. Large errors on these parameters can also cause the processing to become unstable and provide unreliable results.

In some aspects, robust QC processes and procedures to assess the accuracy of the resulting VTI parameters can be beneficial. QC factors can be used with plots of the adopted weights $W_*(f)$, the comparison of measured dispersion curves $S_*^{measure}$ (f) and estimated dispersion $S_*^{estimate}$ (f), as well as the misfit function distribution to monitor the extracted results of vertical shear slowness, anisotropy, and mud slowness. In some aspects, an acquisition-scale, a log-scale display and processing, and a detailed process can be used for the VTI processing of a well with good or bad wellbore conditions.

An acquisition-scale (e.g., single-depth) QC process can display the reliability and trustworthiness of each depth increment in VTI processing. The acquisition-scale QC process can be useful for generating an initial processing parameter table for different formation layers with a fine resolution spot-checking process. The parameter table with layer information can be used for the whole-log processing.

The adopted weights can be considered a part of the QC process, since computing these weights can be used for the automated selecting of reliable observed dispersion curve points. A comparison of optimum dispersions with measured dispersions can be used to inspect for mismatches across frequencies and different modes. Specifically, for FL waves of WL examples, or screw waves of LWD examples, a point can be estimated if the dispersions overlay the measured dispersions to the low-frequency limit. For ST waves in both WL and LWD examples, a QC check can be used to determine if the optimum ST dispersion matches the measured dispersion at low frequencies (e.g. below 2.5 kHz). In some aspects, the normalized inverse of the misfit function shows the numbers of local minima and the relative position of the extracted global minimum within the trial grid space as follows, $$Img(\gamma, s) = \frac{\min[M(\gamma, s)]}{M(\gamma, s)},$$

where Img($\gamma$, s) can be distributed from 0 to 1. Further, a $\alpha$ confidence contour can be calculated and then plotted on the image to display the uncertainty range of the inverted shear-wave slowness and Thomsen parameter γ. We construct the α confidence contour from $$Img(\gamma, s) \geq \left(1 + \frac{k}{n-k} f_{k,n-k}(1-\alpha)\right)^{-1},$$

where n can be the degree of freedoms for measured data, k can be the number of model parameters, and f can be the inverse of F probability distribution. With the above QC parameters, VTI processing can be monitored for reliable results.

Figure 3:
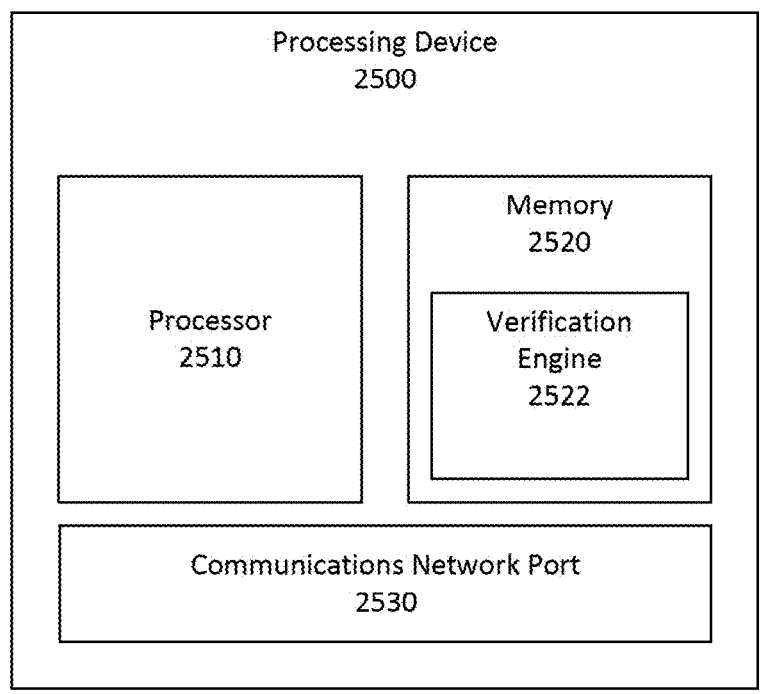
FIG. 3 is a block diagram of an example of a processing device for verifying measurements of elastic anisotropy parameters in an anisotropic wellbore environment according to one aspect of the present disclosure.

FIG. 3 is a block diagram depicting an example of a processing device 2500 that can determine estimates of characteristics of an anisotropic wellbore environment that affect signal propagation. The processing device 2500 can include any number of processors 2510 for executing program code stored in memory 2520. The processing device 2500 can also include a communications network port 2530. In some aspects, the processing device 2500 can be communicatively coupled to a well tool (e.g., the well tool 120 in FIGS. 1-2) by the communications network port 2530. In additional or alternative aspects, the processing device 2500 can be included in a well tool.

Examples of the processing device 2500 can include a microprocessor, an application-specific integrated circuit ("ASIC"), a field-programmable gate array ("FPGA"), or other suitable processor. In some aspects, the processing device 2500 can be a dedicated processing device used for determining estimates of characteristics of an anisotropic wellbore environment that affect signal propagation. For example, the processing device can be communicatively coupled, via the communications network port 2530, to a well tool that receives signals that have propagated through the wellbore environment. The processing device 2500 can determine that signal reliability can be improved by improving the estimate of an individual propagation characteristic. In other aspects, the processing device 2500 can perform functions in addition to verifying estimates of propagation characteristics such as extracting information from a received signal.

The processing device 2500 can include (or be communicatively coupled with) a non-transitory computer-readable memory 2520. The memory 2520 can include one or more memory devices that can store program instructions. The program instruction can include, for example, a verification engine 2522 that is executable by the processing device to perform certain operations described herein.

The operations can include evaluating the correctness of vertical shear slowness and anisotropy γ for a whole log. The operation can further include flagging certain depths, based on the log-scale assessment, for acquisition-scale assessment. The operations can further include evaluating the certain depths using an acquisition-scale assessment. The operations can further include verifying estimates of propagation characteristics of an anisotropic wellbore environment.

The operations can include storing the estimates of propagation characteristics in the memory 2520 and updating the estimates based performing the log-scale assessment and the acquisition-scale assessment. The processing device 2500 can access the estimates stored in the memory 2520 to determine data from subsequent signals propagating through the anisotropic wellbore environment faster and more accurately.

Figure 4:
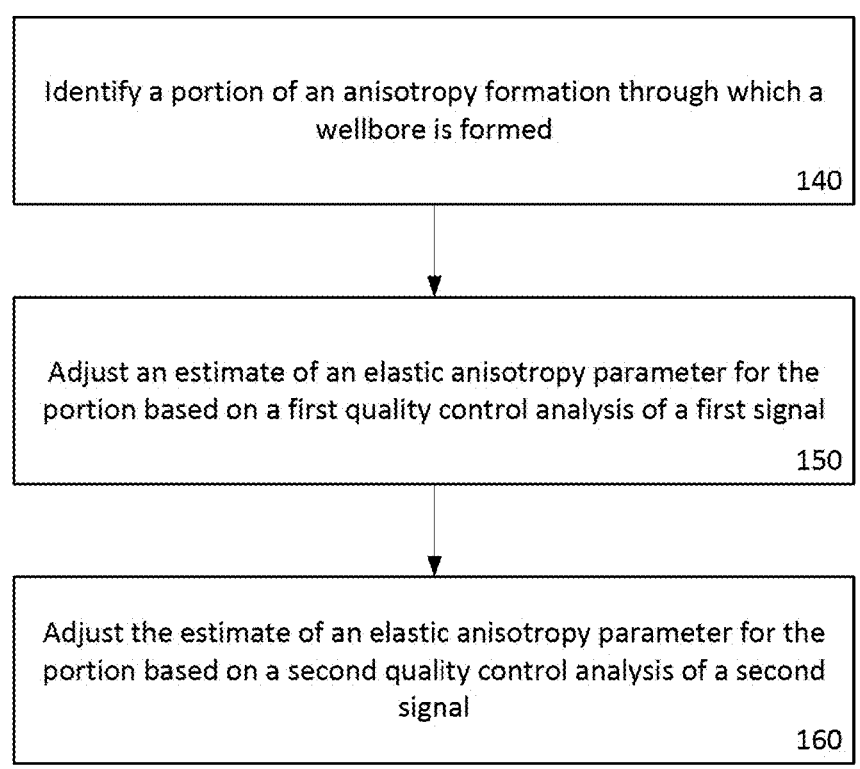
FIG. 4 is a flow chart of an example of a process for verifying measurements of elastic anisotropy parameters in an anisotropic wellbore environment according to one aspect of the present disclosure.
Figure 5:
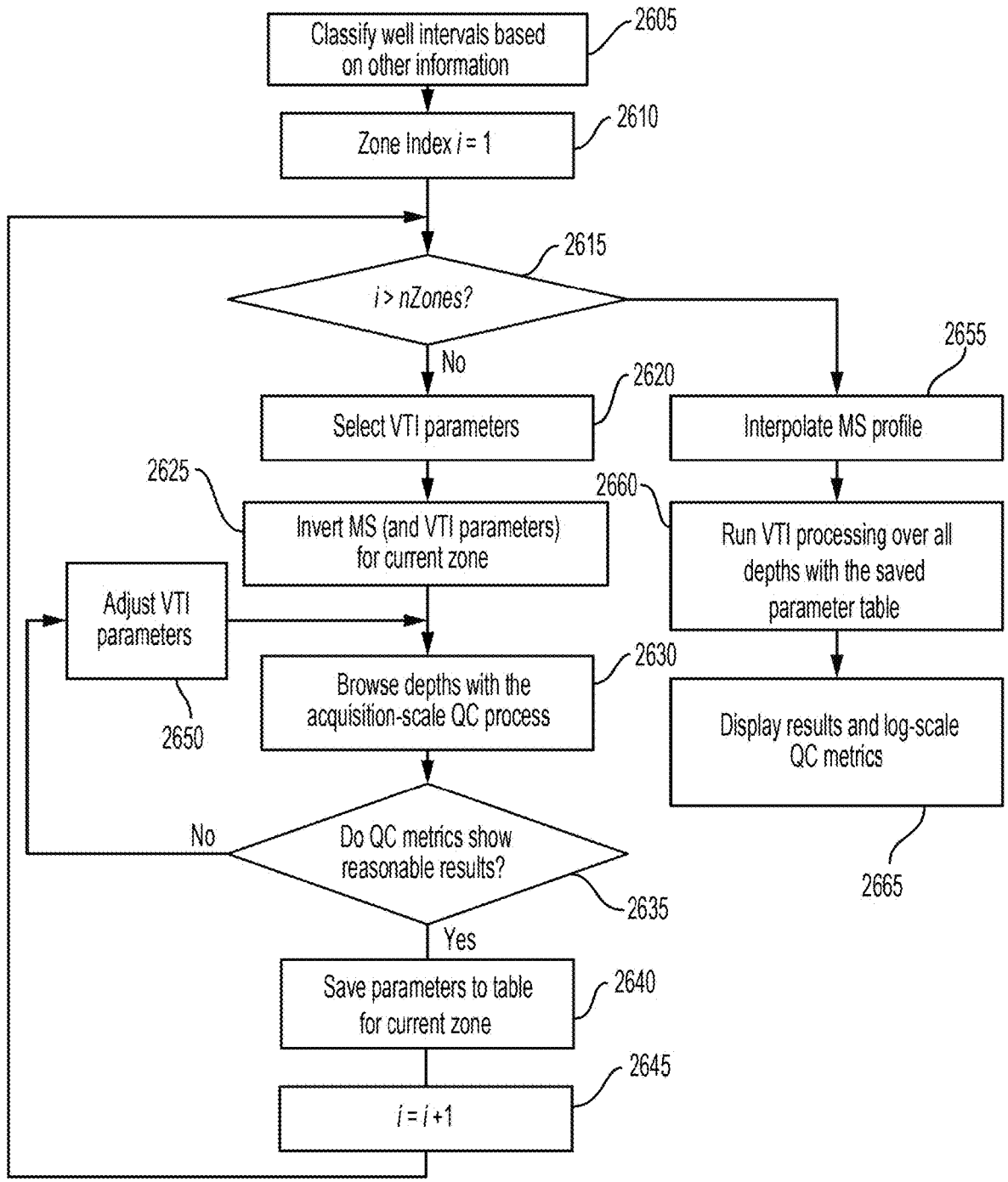
FIG. 5 is a flow chart of an example of a process for verifying measurements of elastic anisotropy parameters in an anisotropic wellbore environment that is in good condition according to one aspect of the present disclosure.
Figure 6:
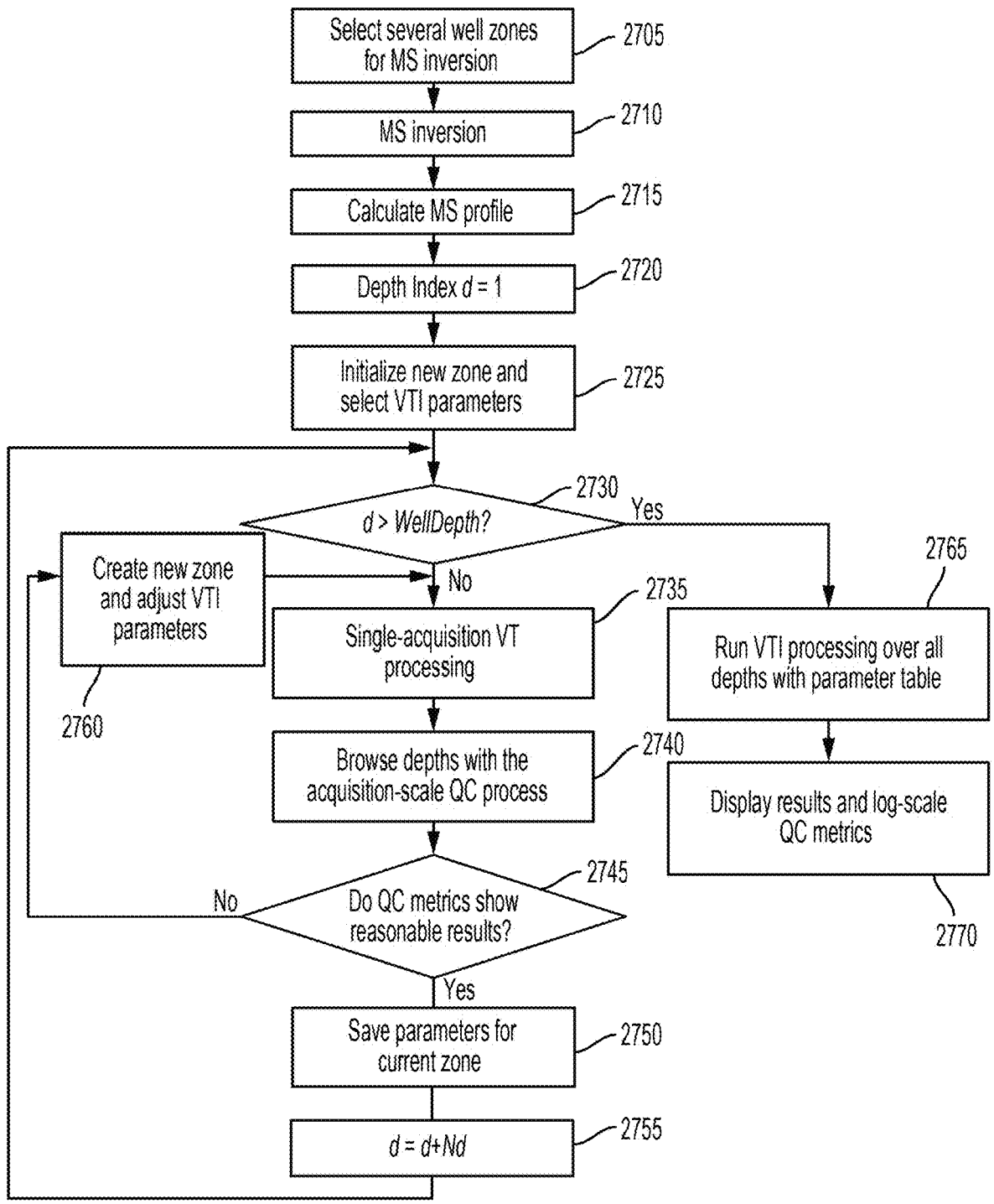
FIG. 6 is a flow chart of a process for verifying measurements of elastic anisotropy parameters in an anisotropic wellbore environment that is in poor condition according to one aspect of the present disclosure.

Examples of some processes for extracting vertical shear slowness, mud slowness, and percentage of VTI anisotropy are shown in FIGS. 4-6. For wells in good conditions (i.e. no wellbore sidewall collapse), the system can delineate the well zones according to the known formation layer information or existing log. For example, using the log of the formation compressional slowness as a basis, the system can select processing parameters independently for each zone.

In some aspects, a process for verifying propagation characteristics can include selecting a zone of the wellbore having stable sidewall conditions. A process for verifying propagation characteristics can further include adjusting the processing parameter table for estimating the propagation characteristics for the zone based on an acquisition-scale analysis of the zone. A process for verifying propagation characteristics can also include adjusting the parameter tables based on performing log-scale analysis of the whole wellbore. A process for verifying propagation characteristics can further include work flows to perform the estimating of the propagation characteristics with the parameter tables generated by the acquisition-scale analysis of the zone or a log-scale analysis of the whole wellbore.

FIG. 4 is a flow chart depicting a process for verifying measurements of elastic anisotropy parameters in an anisotropic wellbore environment. The process is described below as implemented by the processing device 2500 in FIG. 3, but other implementations are possible. In some aspects, the process can be performed substantially in real time with a LWD application.

In block 140, the processing device 2500 can identify a portion of an anisotropy formation through which a wellbore is formed. In some aspects, the processing device 2500 can identify a segment of the wellbore through the portion having stable sidewall conditions. In additional or alternative aspects, the processing device 2500 can identify more than one portion of the anisotropy formation. In some examples, the portion of the anisotropy formation can be identified based on a well tool being positioned in a segment of the wellbore through the portion.

In block 150, the processing device 2500 can adjust the estimate of the elastic anisotropy parameter for the portion based on a local quality control analysis. The estimate can include estimates of vertical propagating shear-wave slowness, mud slowness, and the Thomsen Gamma anisotropy parameter ("γ"). In some examples, the estimate can be determined based on the type of rock in the anisotropic formation. In some aspects, the processing device 2500 can adjust the estimate of the elastic anisotropy parameter for the portion based on the local quality control analysis of a first signal using estimate for the elastic anisotropy parameter for the portion. The first signal can represent the elastic anisotropy parameter for the portion. In some aspects, the local quality control analysis can include an acquisition-scale quality control analysis of a first signal received by a well tool communicatively coupled to the processing device and positioned in the wellbore. The first signal may have been generated based on a first actual value, and the processing device 2500 can determine that first data from the first signal is more than a threshold amount from the first actual value due to the estimate being inaccurate. The processing device 2500 can calculate adjustment to the estimate such that data extracted from a subsequent signal is closer to the actual value from which the subsequent signal was generated.

In block 160, the processing device 2500 can adjust the estimate of the elastic anisotropy parameter for the portion based on a second quality control analysis of a second signal. The second quality control analysis can use estimates of the elastic anisotropy parameters for multiple portions and the second signal can represent the elastic anisotropy parameters for the multiple portions. In some aspects, the processing device 2500 can perform a whole wellbore quality control analysis. In some aspects, the whole wellbore quality control analysis can include a log-scale quality control analysis of a second signal received by the well tool positioned in a different portion of the wellbore. The whole wellbore quality control analysis can determine if second data extracted from a second signal based on the estimate and another estimate of the elastic anisotropy parameter associated with another portion of the wellbore is within a threshold value of second actual data from which the second signal was formed. In some aspects, the well tool may be positioned in the other portion of the wellbore and the second signal can be received by the well tool in the other position. In some aspects, the whole wellbore quality control analysis can be used to identify portions of the wellbore for adjustment by an acquisition-scale quality control analysis. In additional or alternative aspects, the acquisition-scale quality control analysis can improve the whole wellbore quality control analysis.

FIG. 5 is a flow chart depicting a process for performing a VTI processing with the parameter tables generated by the acquisition-scale analysis of zones in a wellbore or a log-scale analysis of the whole wellbore, in a well that is in good condition. The process is described below as implemented by the processing device 2500 in FIG. 3, but other implementations are possible.

In block 2605, the processing device 2500 classifies the well into zones. The processing device can use additional information (e.g., formation compressional slowness) to zone the well. In block 2610, the processing device 2500 sets the current zone to an initial zone. In block 2615, the processing device 2500 determines if all of the zones have been processed. In some aspects, the processing device 2500 compares a variable indicating the current zone with a threshold value representing the number of zones. If the variable indicating the current zone exceeds the threshold value, the process proceeds to block 2655. Otherwise, the process continues to block 2620.

In block 2620, the processing device 2500 selects a processing parameter (e.g., vertical shear, mud slowness, and VTI gamma) for the current zone. In block 2625, the processing device 2500 inverts mud slowness or other VTI parameters for the current zone. The mud slowness for the current zone can be inverted with a depth buffer by selecting datasets acquired at depths where the wellbore sidewall is in good condition. The chosen depths for inversion can cover a relatively small depth range so that the system can assume that mud slowness is constant. In additional or alternative aspects, processing a zone that includes a variety of different formations can increase the inversion accuracy by reducing the trade-off of model parameters.

In block 2630, the processing device 2500 can browse depths with the acquisition-scale QC process. Observing VTI processing results at depths with the acquisition-scale QC process can allow the processing device 2500 to check if the current parameters are able to meet processing requirements. In block 2635, the processing device 2500 determines if the QC metrics provide reasonable results. If the QC metrics are unreasonable, the process proceeds to block 2650, in which the VTI parameters are adjusted, and returns to block 2630 to observe the adjusted VTI parameters at different depths. Otherwise, the process proceeds to block 2640, in which the processing device 2500 stores the validated parameters. In block 2645, the processing device 2500 increments the zone and returns to block 2615 to determine if the incremented zone exceeds the threshold value.

In block 2655, the processing device 2500 interpolates the mud slowness profile across all depths after the parameters for all of the zones have been saved. In block 2660, the processing device performs VTI processing over all depths using the parameters table and mud slowness profile. In block 2665, the processing device 2500 can display results and log-scale QC metrics. The results can be QC displays as depicted in FIGS. 7-26 for indicating to a user the quality of the elastic anisotropy parameter estimates.

In additional or alternative aspects, a data-driven procedure can delineate zones with different VTI processing parameters if the well is in poor condition (i.e., irregular wellbore or large wellbore washout). FIG. 6 is a flow chart depicting a process for performing a VTI processing with a data-driven procedure, in a well that is in poor condition. The process is described below as implemented by the processing device 2500 in FIG. 3, but other implementations are possible.

In block 2705, the processing device 2500 can select several well zones that have stable wellbore conditions. In block 2710, the processing device 2500 can invert mud slowness in each of the selected well zones with stable wellbore conditions and in block, 2715 the processing device 2500 can calculate a mud slowness profile. In block 2720, the processing device 2500 can set a variable indicating the current depth to one and in block 2725, the processing device 2500 can create a new zone and select initial VTI parameters for the new zone. In some aspects, the processing device 2500 can assign the new zone default VTI processing parameters based on the mud slowness profile.

In block 2730, the processing device 2500 determines if the variable indicating the current depth exceeds a threshold value representing the depth of the wellbore. If the current depth exceeds the threshold value, the process proceeds to block 2765. Otherwise, the process proceeds to verify the signal propagation characters at the current depth by proceeding to block 2735. In block 2735, the processing device 2500 can perform single-acquisition VTI processing at the current depth. In block 2740, the processing device 2500 can browse depths with the acquisition-scale QC process and in block 2745, the processing device 2500 can determine if the QC metrics indicate reasonable results from the acquisition-scale QC process. If the QC metrics indicate unreasonable results (e.g., as in FIGS. 11-12 the process proceeds to block 2760, in which the processing device 2500 creates a new zone, adjusts VTI parameters, and returns to block 2735. If the QC metrics indicate reasonable results (e.g., as in FIGS. 7-10), the process proceeds to block 2750.

In block 2750, the processing device 2500 saves the parameters for the current zone. The parameters can be stored in a database stored in memory 2520. In block 2755, the processing device 2500 can increment the depth in the current zone and return to block 2730 to determine if the depth exceeds the threshold value. In some aspects, the processing device 2500 applies the same VTI parameters to the new depth. The processing device 2500 can use determine QC metrics for the new depth and if the QC metrics indicate good results based on the VTI parameters, the processing device 2500 can skip the current depth and move to the next depth.

In block 2765, the processing device can verify signal propagation characteristics by performing VTI processing over all depths (e.g., the whole well) with the calculated parameter table. In block 2770, the processing device 2500 can display the results (e.g., as the log-scale QC displays in FIGS. 15-26). The displays can be used to monitor the reliability of the VTI processing results by a user or another device.

Figure 7:
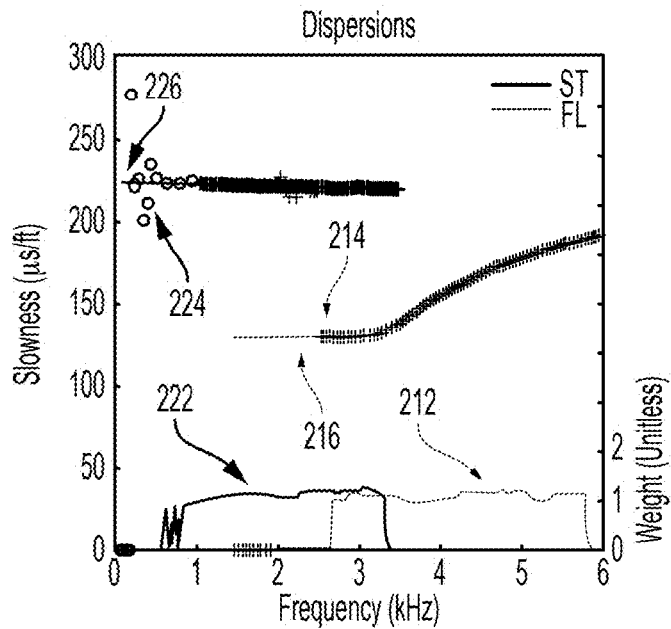
FIG. 7 is an acquisition-scale quality control display depicting examples of measured elastic anisotropy parameters according to one aspect of the present disclosure.
Figure 8:
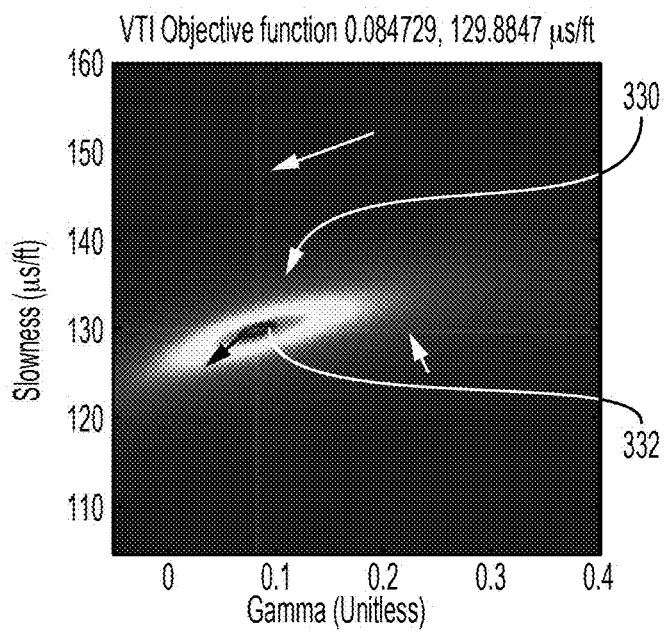
FIG. 8 is a graph of an example of a misfit function with a confidence contour bracketing the optimum vertical transverse isotropy parameters depicted in FIG. 7 according to one aspect of the present disclosure.

For example, FIGS. 7-8 depict an acquisition-scale QC display of VTI processing for the estimation of vertical propagating shear-wave slowness and anisotropy γ from the waveforms measured by a multipole wireline acoustic tool string.

FIG. 7 is a diagram depicting a comparison of FL weight 212 and ST weight 222, a comparison of measured FL dispersion 214 and estimated FL dispersion 216, and a comparison of measured ST dispersion 224 and estimated ST dispersion 226. FIG. 8 is a diagram depicting a misfit function image with a 95% confidence contour 332 bracketing the optimum VTI parameters. FIGS. 7-8 depict an anisotropic formation with γ=0.085. The weights 212, 222 indicate that an appropriate frequency range with high-quality dispersion can be selected. The comparison between measured FL dispersion 214 and estimated FL dispersion 216 and the comparison between measured ST dispersion 224 and estimated ST dispersion 226 show that the predicted data matches the measured data for some of the selected frequencies, suggesting that both the extracted shear slowness and anisotropy are reliable and accurate. In addition, only one peak 330 can be observed in the misfit function image, with a relatively small 95% confidence contour 332, indicating that both shear slowness and anisotropy are well estimated and form a reliable solution.

Figure 9:
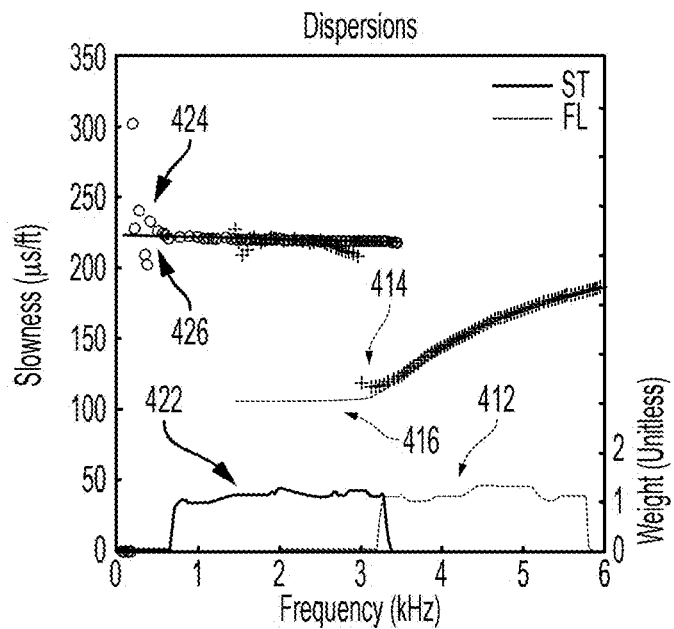
FIG. 9 is an acquisition-scale quality control display depicting additional examples of measured elastic anisotropy parameters according to one aspect of the present disclosure.
Figure 10:
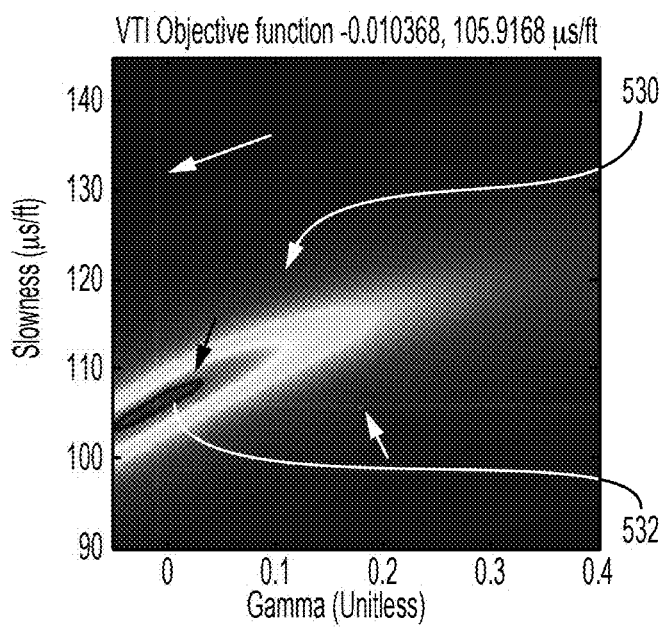
FIG. 10 is a graph of an example of a misfit function with a confidence bracketing the optimum vertical transverse isotropy parameters depicted in FIG. 9 according to one aspect of the present disclosure.

FIGS. 9-10 depict an acquisition-scale QC display of VTI processing results of another example with an isotropic formation (γ=0). FIG. 9 is a diagram depicting a comparison of FL weight 412 and ST weight 422, a comparison of measured FL dispersion 414 and estimated FL dispersion 416, and a comparison of measured ST dispersion 424 and estimated ST dispersion 426. FIG. 10 is a diagram that depicts a misfit function image with a 95% confidence contour 532. The diagrams indicate that the calculated adaptive weights 412, 422 are reasonable. The estimated FL dispersion 416 and estimated ST dispersion 426 accurately predict the measured FL dispersion 414 and measured ST dispersion 424. The misfit function image shows a single and clear optimum solution 430. The QC factors suggest that VTI processing can be reliable, and that vertical shear slowness and anisotropy γ are correctly extracted.

Figure 11:
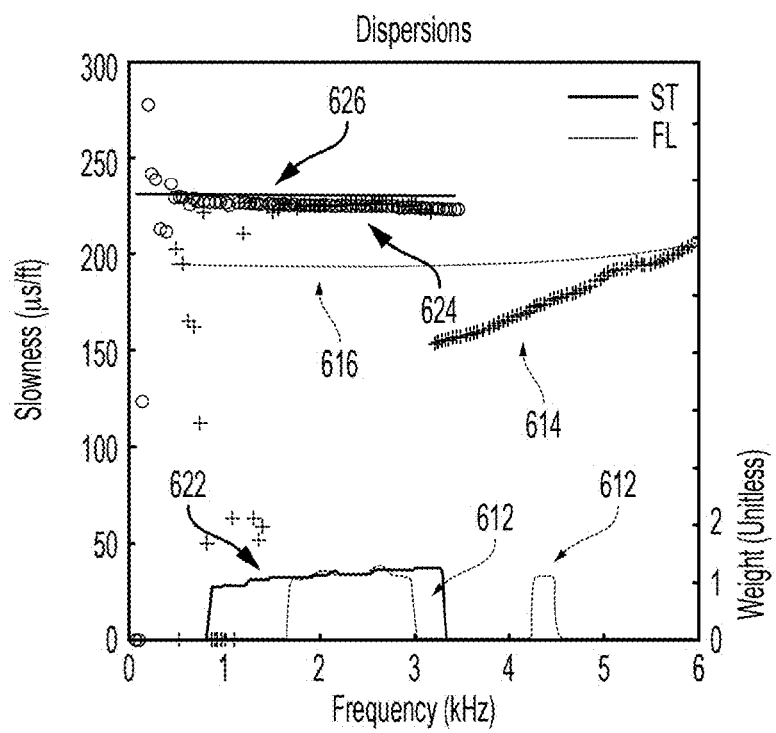
FIG. 11 is an acquisition-scale quality control display depicting additional examples of measured elastic anisotropy parameters according to one aspect of the present disclosure.
Figure 12:
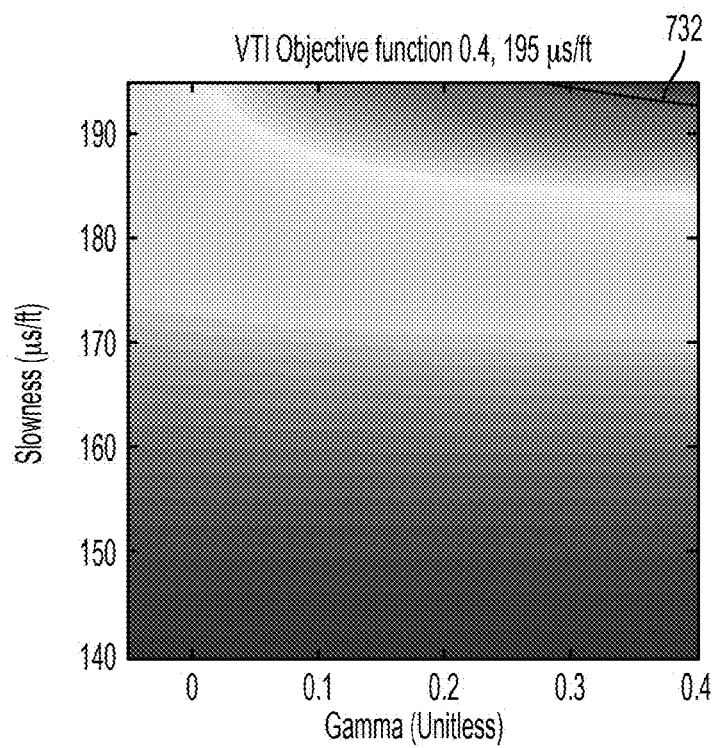
FIG. 12 is a graph of an example of a misfit function with a confidence contour bracketing the optimum vertical transverse isotropy parameters depicted in FIG. 11 according to one aspect of the present disclosure.

In some aspects, a QC display may depict unreliable VTI measurements. For example, FIGS. 11-12 depict an example of an acquisition-scale QC display of VTI processing for a hard formation. FIG. 11 is a diagram depicting a comparison of FL weight 612 and ST weight 622, a comparison of measured FL dispersion 614 and estimated FL dispersion 616, and a comparison of measured ST dispersion 624 and estimated ST dispersion 626. FIG. 12 is a diagram depicting a misfit function image with a confidence contour 732 that truncates against the grid that defines it. This can be determined by inspecting FIG. 11, which shows the FL weight 612 is inaccurate for the measured FL dispersion 614. Although the ST weight 622 is appropriate, the FL weight 612 is split into two pulses, which are applied in a lower frequency than a common FL excitation frequency. The inaccurate FL weight 612 can lead to incorrect estimates for both shear slowness and anisotropy. This can also be deduced from comparing the measured and estimated dispersion curves, as well as the misfit function image that shows no isolated solution within the boundaries of the grid. In FIG. 11 the estimated data 616, 626 does not agree with the measured data 616, 626, and a peak associated with realistic VTI anisotropy does not exist in the misfit function image. FIGS. 11-12 demonstrate that the proposed QC process can detect abnormalities in the processing results and further suggests, in this example, that the weighting process for ST and FL can be revised to improve data communication.

Figure 13:
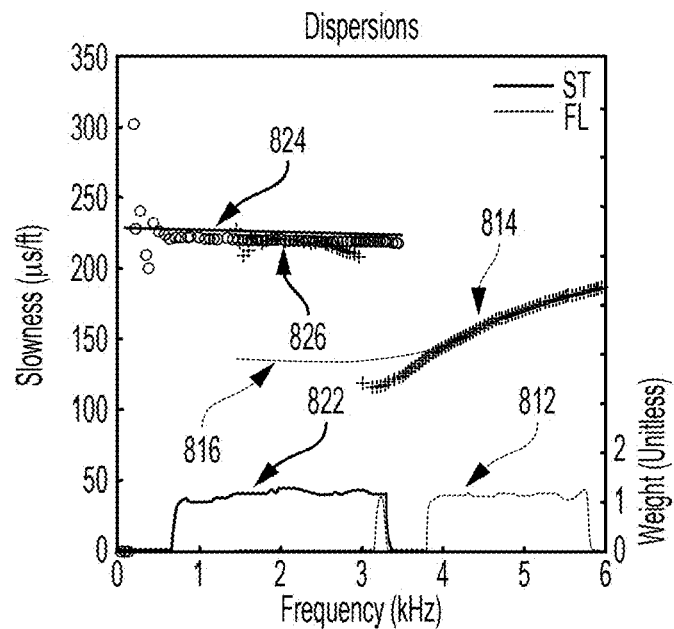
FIG. 13 is an acquisition-scale quality control display depicting additional examples of measured elastic anisotropy parameters according to one aspect of the present disclosure.
Figure 14:
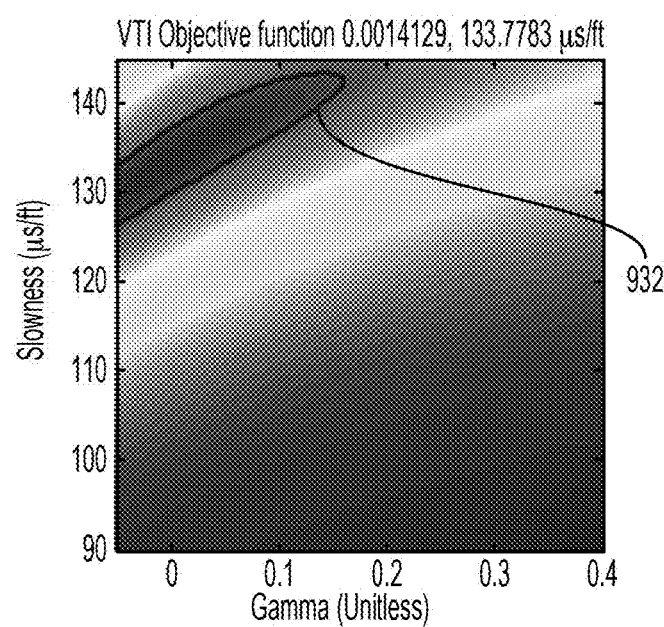
FIG. 14 is a graph of an example of a misfit function with a confidence contour bracketing the optimum vertical transverse isotropy parameters depicted in FIG. 13 according to one aspect of the present disclosure.

FIGS. 13-14 depict an example of another result of VTI processing with all QC parameters plotted for a single-depth.

FIG. 13 is a diagram depicting a comparison of FL weight 812 and ST weight 822, a comparison of measured FL dispersion 814 and estimated FL dispersion 816, and a comparison of measured ST dispersion 824 and estimated ST dispersion 826. FIG. 14 is a diagram that depicts a misfit function image with confidence contour 932. The FL weight 812 and the ST wave 822 are accurate. The reason that the estimated data 816, 826 differentiates from the measured data 814, 824 can be attributed to factors that are not accounted for in modeling (e.g., irregular wellbore, radial slowness gradient due to an invasion, more complicated anisotropy, and formation permeability). The FL weight 812 and ST weight 822 can accurately span the measured FL dispersion 814 and the measured ST dispersion 824. But, comparison of optimum and measured dispersions show that the estimated data 516, 526 does not fit well to the measured data 814, 824, especially for the FL low-frequency asymptotes and the ST low-frequency range. This QC factor suggests the optimum parameters are not well resolved, which can also be quantified by the enlarged confidence contour 932 in FIG. 14. The cause of such mismatch may be due to some factors that are not accounted for in the forward modeling, e.g., irregular wellbore shape, invasion, more complicated anisotropy, and formation permeability, or it may be the error of input parameters, e.g. wellbore radii or mud density.

In additional or alternative aspects, a log-scale QC process can be used to evaluate, at a high level, the correctness of vertical shear slowness and anisotropy γ for a whole log. In some examples, certain depths may be flagged for acquisition-scale QC based on the log-scale QC assessment.

The log-scale QC can adopt the normalized inverse of the misfit in slowness axis along the line γ=$γ_{est}$ and in Thomsen parameter γ axis along the line s=$s_{est}$ as QC metrics for shear slowness and γ, respectively. The error bars of shear slowness and γ can also be included to show the confidence range of these two estimates. The misfit function projection, error bars, and estimates can be plotted along the same track, for vertical shear-wave slowness and Thomsen parameter γ, respectively. The fitting residuals for FL waves and ST waves can be introduced as additional QC metrics to display the goodness of fit between the optimum and measured dispersion. The computed weights for FL waves and ST waves can also be displayed for monitoring if an appropriate weighting function was used. Additionally, a new metric for misfit reduction can be defined, $$Rsq = \left[1 - \frac{M(\gamma_{est}, s_{est})}{M(\gamma = 0, s_{est})}\right] \times 100\%,$$

where M ($γ_{est}$, $s_{est}$) means misfit value at the global minimum in a 2d Gamma and slowness map, and M (γ=0, $s_{est}$) can be the value of the local minimum along the γ=0 line. The misfit reduction metric quantifies the percentage of the residual that may not be explained by the isotropic model that can be explained by the VTI model. Values below 30% can suggest there is either little anisotropy present or there is anisotropy that is not explained well by the VTI model. Values above 70% suggest that almost all of the residual can be explained by the VTI model. Therefore, large anisotropy γ that has a low Rsq can suggest the result is not reliable. Rsq is a metric that is generally proportional to the γ error bar as well as quantifies the demand for additional physics in the modeled VTI dispersion curves when the isotropic model does not fit the dispersion curves well.

For example, FIGS. 15-20 present a log-scale QC display of VTI processing for a well section with a depth range of 45 ft.

Figures 15, 16, 17, 18, 19, 20:
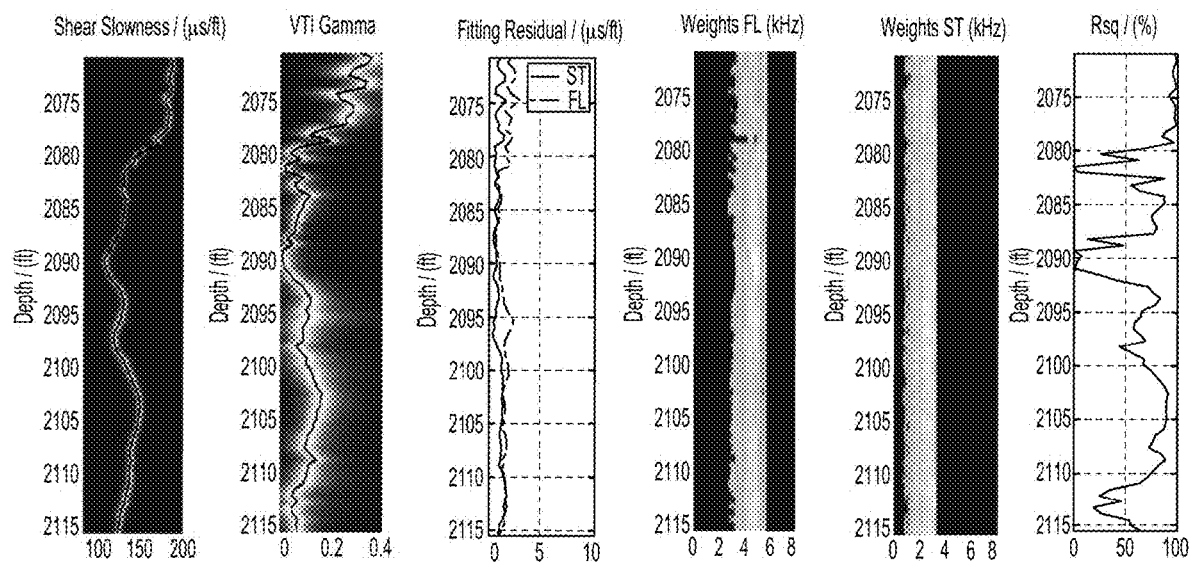
FIGS. 15-20 are diagrams of examples of a log-scale quality control display with accurate processing parameters according to some aspects of the present disclosure.

FIG. 15 is a graph that depicts shear slowness estimates, uncertainties, and misfit function projection. FIG. 16 is a graph that depicts γ estimates, uncertainties, and misfit function projection. FIG. 17 is a graph that depicts fitting residuals for FL and ST waves. FIG. 18 is a graph that depicts weights of FL waves as a function of frequency (x-axis). FIG. 19 depicts a graph of weights of ST waves. FIG. 20 is a graph that depicts Rsq.

The optimum vertical shear slowness and γ lie within continuous white bands and have small error bars. The residuals for FL and ST waves are relatively low (<2.5 μs/ft.), further suggesting that the optimum dispersions can fit the measured FL and ST dispersions well. FIGS. 15-20 indicate that the FL and ST weights show stable and continuous values covering main excitation frequency of FL and ST waves. White values are weights that have values close to 1. All these metrics suggest that reliable estimates of vertical shear-wave slowness and Thomsen parameter γ have been obtained. FIG. 20 displays percentage of the fitting error that can be explained by formation γ. For some depths, more than 50% percent of residual not explained by an isotropic model can be explained with the VTI model.

Figure 21:
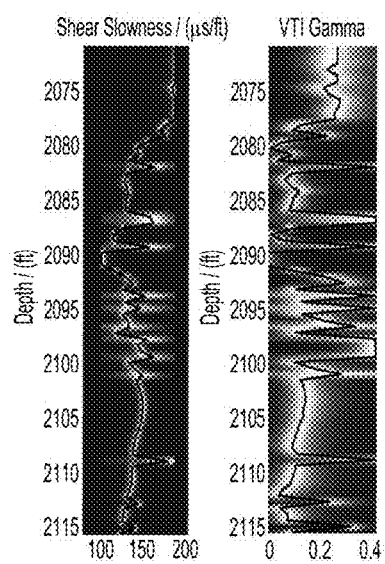
FIGS. 21-26 are diagrams of examples of a log-scale quality control display with inaccurate processing parameters according to some aspect of the present disclosure.
Figure 22:
Figure 23:
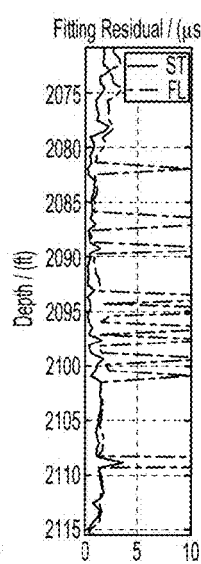
Figure 24:
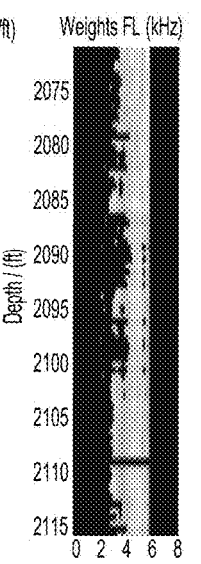
Figure 25:
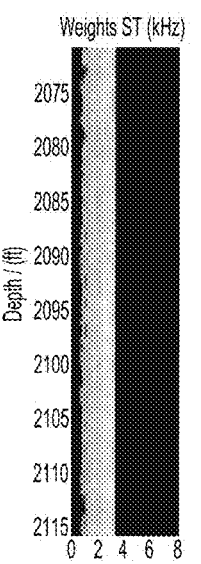
Figure 26:
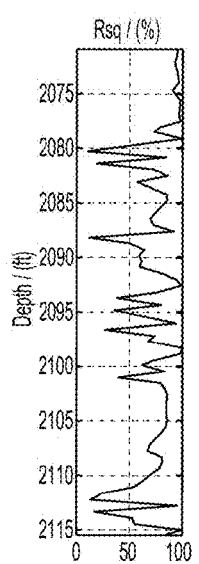

FIGS. 21-26 present a log-scale QC display indicating abnormities in the VTI results caused by inappropriate estimates of the parameters. In some examples, the inappropriate estimates of the parameters are made by a processing device included in (or communicatively coupled) to a well tool communicating with wireless signals. FIG. 21 is a graph that depicts shear slowness estimates, uncertainties and misfit function projection. FIG. 22 is a graph that depicts γ estimates, uncertainties, and misfit function projection. FIG. 23 is a graph that depicts fitting residuals for FL and ST waves. FIG. 24 is a graph that depicts weights of FL waves as a function of frequency (x-axis). FIG. 25 is a graph that depicts weights of ST waves. FIG. 26 is a graph that depicts Rsq. The QC display shows unreliable results at the following depths: 2082, 2087, 2089, 2094 to 2101, and 2109 ft.

The misfit function projections are not continuous in depth, and multiple peaks exist for some depths. Meanwhile, uncertainty estimation and residual fitting results show large values in some depths. This can indicate that the VTI processing at those depths are unreliable. The computed weights for FL waves are not continuous and they suddenly decrease to zero at low frequencies (e.g., below 4 kHz) in several intervals. These unreliable processing results can be efficiently flagged by a processing device for individual analysis while processing an entire log simply by inspecting these QC metrics. For example, for the results shown in FIGS. 21-26, the depths with unreliable results can include 2082, 2087, 2089, 2094 to 2101 and 2109 ft., respectively.

In some aspects, the FL and ST dispersions can be sensitive to the mud slowness. Therefore, the estimates can be refined by defining a global objective function over a trial grid of mud slowness, where the objective function can be the sum of L2 norms over a multiplicity of depths evaluated at the depth dependent values (e.g., vertical shear slowness, γ) inverted with assumed mud slowness dtm, $$M(dtm) = \sum_{FL,f,d} [S_{FL}^{model}(f, \gamma_d(dtm), s_d(dtm), dtm) - S_{FL,d}^{measure}(f)]^2 W_{FL,d}(f) +$$
$$\sum_{ST,f,d} [S_{ST}^{model}(f, \gamma_d(dtm), s_d(dtm), dtm) - S_{ST,d}^{measure}(f)]^2 W_{ST,d}(f),$$

where s(dtm) and γ(dtm) represent the vertical shear slowness and Thomsen γ found by the routine VII processing with assumed mud slowness dtm, and d refers to depth index. Note that both VTI parameters (s and γ as a function of depth) are also a result of the inversion. It can be preferred to use a smooth interpolation routine to upsample M(dtm) and obtain precise mud slowness at the global minimum. The confidence interval of mud slowness estimates can be constructed by the following equation, $$\frac{M(dtm)}{\min[M(dtm)]} \leq 1 + \frac{k}{n-k} f_{k,n-k}(1-\alpha)$$

Where n is the number of data degrees of freedom that are constrained by synthetic experiments with varying noise levels and k is the number of modeling degrees of freedom. Consequently, the fitting curves, misfit datasets, and confidence interval are plotted together as a QC metric.

Figure 27:
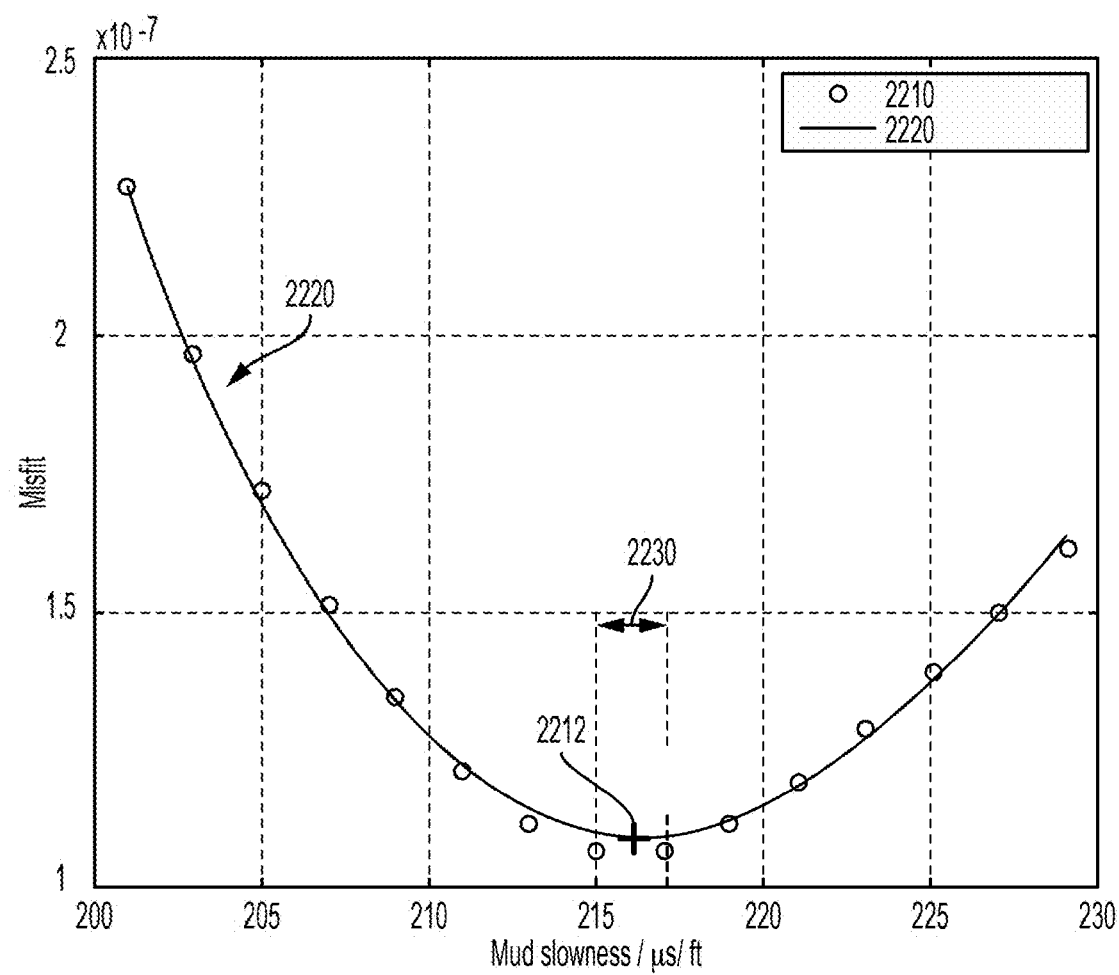
FIG. 27 is a diagram of an example of a graph of quality control metrics for mud slowness inversion according to one aspect of the present disclosure.

For example, FIG. 27 shows the mud slowness results for a fast formation wellbore. The misfit datasets 2212 have a clear and single local minimum, and the polynomial fitting curve 2220 matches with the misfit datasets 2210 with a narrow confidence interval 2230, suggesting that the mud slowness can be estimated. The estimated value for mud slowness for this example is 216.1 μs/ft.

The above inversion process can obtain the mud slowness by using the sonic measurements in a relatively short well zone (or "interval"), where the mud slowness can be close to constant. In some examples, variations in pressure and air content between different depths throughout the well can result in variable mud slowness based on depth. The well zones can be delineated and mud slowness can be inverted for each zone. In some aspects, the sonic data can be acquired from the depths with good wellbore sidewall conditions for performing the inversion. The mud slowness profile can be constructed with an interpolation or a curve-fitting process between the inverted mud slownesses. For example, a spline interpolation can be adopted to generate a mud slowness log.

Figure 28:
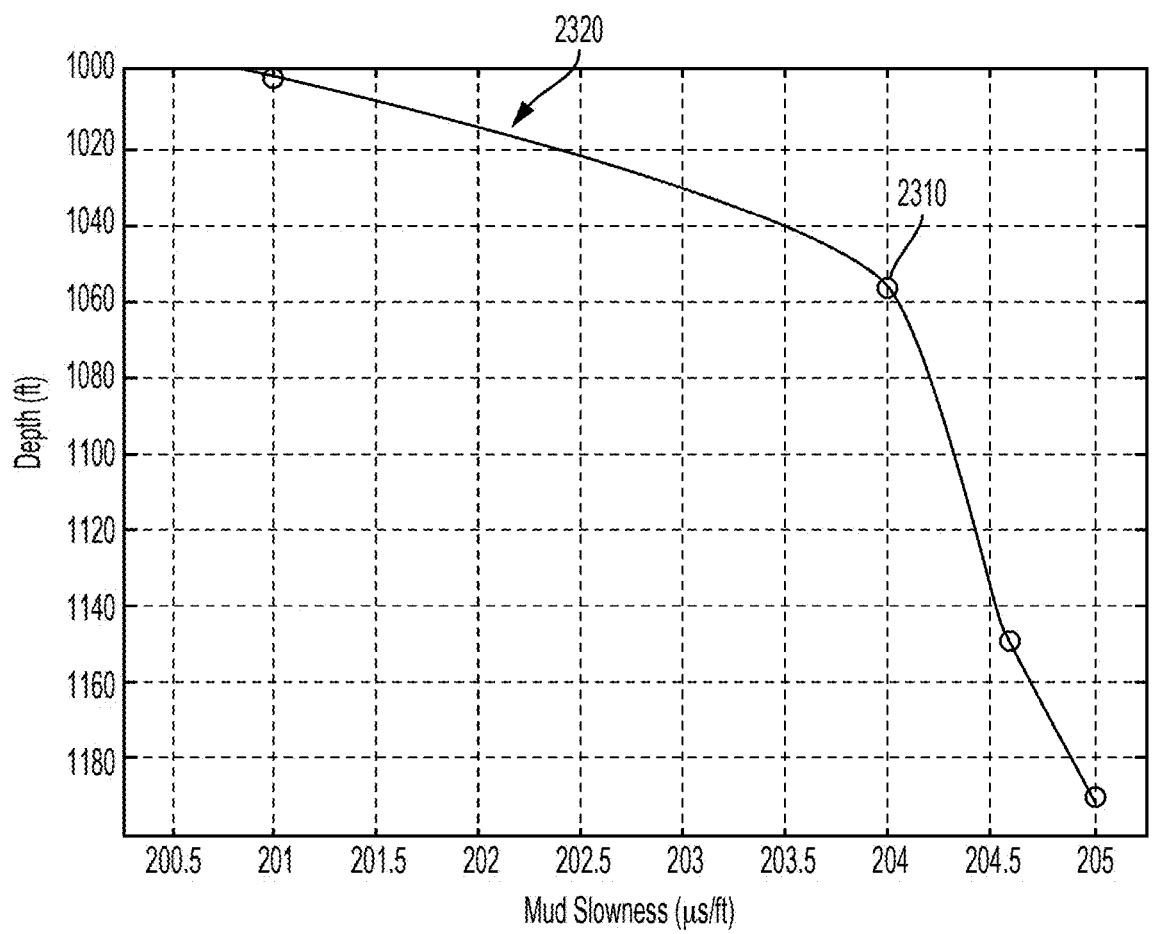
FIG. 28 is a diagram of an example of a mud slowness profile versus depth estimation of different zones according to one aspect of the present disclosure.

FIG. 28 shows an example of a constructed mud slowness profile versus depth estimation of different zones using a spline interpolation. The circles 2310 represent inverted mud slownesses for the corresponding depth intervals, and the solid curve 2320 denotes the constructed mud slowness profile after a spline interpolation. Such an interpolation processing can be suitable for wells that air content changes rapidly. In wells with constant or gradual changes in the air content, a curve-fitting procedure can be used to generate a mud slowness profile versus depth from the zone-by-zone inverted mud slowness values. This curve fitting procedure can further improve the quality of the mud slowness profile by using all the data of the well. For example, a linear fitting might be a good option to get the mud slowness profile for all depths.

Figure 29:
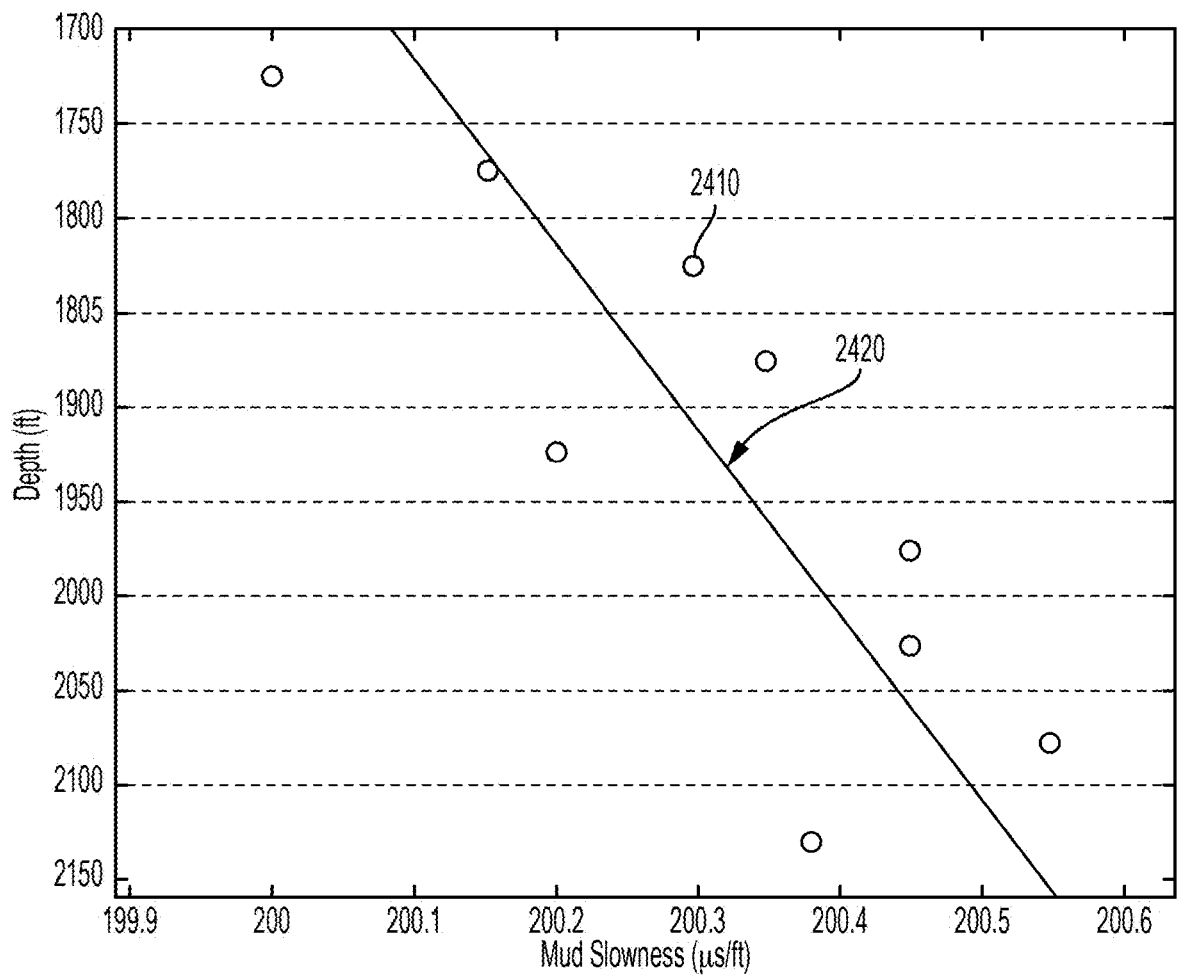
FIG. 29 is a diagram of an example of a mud slowness profile determined based on mud slowness estimates in different well zones and a linear-fitting process according to one aspect of the present disclosure.

For example, FIG. 29 shows an example of constructing a mud slowness profile versus depths with a linear fitting approach. The circles 2410 represent inverted mud slownesses for their corresponding depth intervals, and the solid curve 2420 denotes the reconstructed mud slowness profile after the linear interpolation. In some examples, processing for VTI and mud slowness assumes that Thomson ε equals Thomson γ in generating modeled dispersion data. This assumption can be useful for formations without any prior information, but can introduce additional error for mud slowness and VTI inversion. The QC process can use the modeled dispersion data with a fixed Thomson ε to Thomson γ ratio, instead of a fixed Thomson ε equal to Thomson γ. This fixed Thomson ε to Thomson γ ratio may be determined by a processing device based on the formation type in the wellbore environment. Dispersion libraries with different Thomson ε to Thomson γ ratios can be stored to a memory, and then the dispersion data with a specific Thomson ε to Thomson γ ratio may be determined by interpolating among the libraries with different Thomson ε to Thomson γ ratios. Using a Thomson ε to Thomson γ ratio as an input parameter can improve the inverted results by decreasing uncertainty from errors in estimating Thomson ε.

In some aspects, verifying measurements of elastic anisotropy parameters in an anisotropic wellbore environment is provided according to one or more of the following examples:

Example #1: A method can include identifying, by a processing device, a portion of an anisotropy formation through which a wellbore can be formed. The method can further include adjusting, by the processing device, an estimate of an elastic anisotropy parameter for the portion based on a first quality control analysis of a first signal using the estimate of the elastic anisotropy parameter for the portion. The first signal can represent the elastic anisotropy parameter for the portion. The method can further include adjusting, by the processing device, the estimate of the elastic anisotropy parameter for the portion based on performing a second quality control analysis of a second signal using estimates for elastic anisotropy parameters for two or more portions of the anisotropy formation. The second signal can represent the elastic anisotropy parameters for the two or more portions of the anisotropy formation.

Example #2: The method of Example #1, further featuring the portion including multiple portions based on depth. Adjusting the estimate of the elastic anisotropy parameter for the portion based on the first quality control analysis can include performing an acquisition-scale analysis of an estimate of the elastic anisotropy parameter for each portion.

Example #3: The method of Example #2, further featuring adjusting the estimate of the elastic anisotropy parameter for the portion based on the second quality control analysis including performing a log-scale analysis of the second signal using the estimate of the elastic anisotropy for each portion.

Example #4: The method of Example #1, further including receiving, by a well tool, the first signal. The well tool can be communicatively coupled to the processing device and positioned in a segment of the wellbore formed through the portion of the anisotropy formation. The method further including receiving, by the well tool, the second signal. The well tool can be positioned in a segment of the wellbore formed through one of the two or more portions of the anisotropy formation. The method further including storing, by the processing device, the estimate of the elastic anisotropy parameter in response to adjusting the estimate such that the processing device more accurately extracts data from subsequent signals using the estimate.

Example #5: The method of Example #1, further featuring identifying the portion including identifying, by the processing device, a section of the wellbore having stable sidewall conditions. Determining the estimate can further include determining, by the processing device, an estimate of a mud slowness parameter for the section.

Example #6: The method of Example #1, further featuring adjusting the estimate of the elastic anisotropy parameter for the portion based on the first quality control analysis including determining, by the processing device, first data from the first signal is more than a threshold amount from a first actual value due to the estimate being inaccurate. Adjusting the estimate of the elastic anisotropy parameter for the portion based on the first quality control analysis can further include calculating, by the processing device, adjustments to the estimate of the elastic anisotropy parameter for the portion such that second data extracted from the second signal is closer to a second actual value.

Example #7: The method of Example #1, further featuring the method can be performed in substantially real time as part of a logging-while-drilling application.

Example #8: A non-transitory computer-readable medium in which instructions are stored. The instructions can be executed by a processing device for causing the processing device to identify a portion of an anisotropy formation through which a wellbore can be formed. The instructions can further be executed for causing the processing device to adjust an estimate of an elastic anisotropy parameter for the portion based on a first quality control analysis of a first signal using the estimate of the elastic anisotropy parameter for the portion. The first signal can represent the elastic anisotropy parameter for the portion. The instructions can further be executed for causing the processing device to adjust the estimate of the elastic anisotropy parameter for the portion based on performing a second quality control analysis of a second signal using estimates for elastic anisotropy parameters for multiple portions of the anisotropy formation. The second signal representing the elastic anisotropy parameters for the multiple portions of the anisotropy formation.

Example #9: The non-transitory computer-readable medium of Example #8, further featuring the portion including multiple portions based on depth. The instructions for causing the processing device to adjust the estimate of the elastic anisotropy parameter for the portion based on the first quality control analysis can include causing the processing device to perform an acquisition-scale analysis of an estimate of the elastic anisotropy parameter for each portion.

Example #10: The non-transitory computer-readable medium of Example #9, further featuring the instructions for causing the processing device to adjust the estimate of the elastic anisotropy parameter for the portion based on the second quality control analysis including causing the processing device to perform a log-scale analysis of the second signal based on the estimate of the elastic anisotropy for each portion.

Example #11: The non-transitory computer-readable medium of Example #8, further featuring the instructions can be executed to cause the processing device to store the estimate of the elastic anisotropy parameter in response to adjusting the estimate such that the processing device more accurately extracts data from subsequent signals using the estimate.

Example #12: The non-transitory computer-readable medium of Example #8, further featuring the instructions for causing the processing device to identify the portion further including causing the processing device to select a section of the wellbore having stable sidewall conditions. The instructions for causing the processing device to determine the estimate can include causing the processing device to determine an estimate of a mud slowness parameter for the section.

Example #13: The non-transitory computer-readable medium of claim 8, further featuring the instructions further can be executed to cause the processing device to store the estimate of the elastic anisotropy parameter for the portion in response to adjusting the estimate of the elastic anisotropy parameter such that the processing device can more accurately extract data from subsequent signals having propagated through the portion using the estimate of the elastic anisotropy parameter for the portion.

Example #14: The non-transitory computer-readable medium of claim 8, further featuring the instructions for causing the processing device to adjust the estimate of the elastic anisotropy parameter for the portion based on the first quality control analysis including causing the processing device to determine first data from the first signal is more than a threshold amount from a first actual value due to the estimate of the elastic anisotropy parameter for the portion being inaccurate. The instructions for causing the processing device to adjust the estimate of the elastic anisotropy parameter for the portion based on the first quality control analysis can further include causing the processing device to calculate adjustments to the estimate of the elastic anisotropy parameter for the portion such that second data extractable from the second signal is closer to a second actual value.

Example #15: A system can include a well tool and a processing device. The well tool can be positioned in a first segment of a wellbore formed through a first portion of an anisotropic formation for receiving a first signal representing an elastic anisotropy parameter for the first portion and can be positioned in a second segment of the wellbore formed through a second portion of the anisotropic formation for receiving a second signal representing elastic anisotropy parameters for the first portion and the second portion. The processing device can be communicatively coupled to the well tool for adjusting an estimate of the elastic anisotropy parameter for the first portion based on a first quality control analysis of the first signal using the estimate of the elastic anisotropy parameter for the first portion. The processing device can be communicatively coupled to the well tool for adjusting the estimate of the elastic anisotropy parameter for the first portion based on a second quality control analysis of the second signal using the estimate of the elastic anisotropy parameter for the first portion and an estimate of the elastic anisotropy parameter for the second portion.

Example #16: The system of Example #15, further featuring the well tool positioned at one of multiple depths in the wellbore for receiving a signal at each depth. The processing device can be communicatively coupled to the well tool for adjusting an estimate of an elastic anisotropy parameter for each depth based on an acquisition-scale analysis of the signal at each depth. The processing device can be communicatively coupled to the well tool for adjusting the estimate of the elastic anisotropy parameter for each depth based on log-scale analysis of another signal representing the elastic anisotropy parameter for each depth.

Example #17: The system of Example #15, further featuring the well tool coupled to a drill positioned in the wellbore. The processing device can be communicatively coupled to the well tool for adjusting the estimate in substantially real time as part of a logging-while-drilling operation.

Example #18: The system of Example #15, further featuring the processing device communicatively coupled to the well tool for adjusting vertical propagating shear wave slowness estimates, mud slowness estimates, and Thomsen anisotropy estimates.

Example #19: The system of Example #15, further featuring the well tool positioned in the wellbore for performing seismic imaging of the anisotropic formation. The processing device can be communicatively coupled to the well tool for improving an accuracy of the seismic imaging by improving an accuracy of the estimate of the elastic anisotropy parameter for the first portion.

Example #20: The system of Example #15, further including a memory for storing the estimate of the elastic anisotropy parameter for the first portion. The processing device can be communicatively coupled to the memory for updating the estimate of the elastic anisotropy parameter for the first portion.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   determining, by a processing device, an estimate of an elastic anisotropy parameter for a first portion of an anisotropy formation through which a wellbore is formed, wherein the estimate of the elastic anisotropy parameter includes an estimate of a mud slowness parameter;
   receiving, by the processing device, a first signal comprising a first acoustic waveform received by a well tool positioned in the first portion;
   executing, by the processing device, a first quality control analysis of the first signal by comparing first data derived from the first signal to a first reference value to determine a difference between the two;
   adjusting, by the processing device, the estimate of the elastic anisotropy parameter for the first portion based on the difference;
   receiving, by the processing device, a second signal comprising a second acoustic waveform received by the well tool positioned in a second portion of the anisotropy formation;
   executing, by the processing device, a second quality control analysis of the second signal to determine a result, wherein the second quality control analysis is adapted to be performed by a different quality control analysis method than the first quality control analysis; and
   adjusting, by the processing device, the estimate of the elastic anisotropy parameter for the first portion based on the result.

2. The method of claim 1, wherein the first portion comprises a plurality of portions based on depth, and wherein executing the first quality control analysis comprises performing an acquisition-scale analysis of a respective estimate of the elastic anisotropy parameter determined for each portion of the plurality of portions.

3. The method of claim 2, wherein executing the second quality control analysis comprises performing a log-scale analysis of the second signal using the respective estimate of the elastic anisotropy parameter for each portion of the plurality of portions.

4. The method of claim 1, further comprising:
storing, by the processing device, the estimate of the elastic anisotropy parameter in response to adjusting the estimate such that the processing device more accurately extracts data from subsequent signals using the estimate.

5. The method of claim 1, further comprising identifying as the first portion of the anisotropic formation a section of the wellbore having stable sidewall conditions, wherein the estimate of the elastic anisotropy parameter is determined for the section.

6. The method of claim 1, wherein further comprising:
determining, by the processing device, that the first data derived from the first signal is more than a threshold amount from the first reference value due to the estimate being inaccurate; and
calculating, by the processing device, adjustments to the estimate of the elastic anisotropy parameter for the first portion such that second data extracted from the second signal is closer to a second reference value.

7. The method of claim 1, wherein the method is performed in substantially real time as part of a wireline logging application or a logging-while-drilling application.

8. The method of claim 1, wherein the difference is a first difference, and wherein the second quality control analysis involves:
deriving, by the processing device, second data from the second signal based on a plurality of estimates of the elastic anisotropy parameter corresponding to a plurality of portions of the anisotropy formation; and
comparing, by the processing device, the second data to a second reference value to determine a second difference between the two, wherein the result comprises the second difference.

9. A non-transitory computer-readable medium in which instructions are stored, the instructions being executable by a processing device for causing the processing device to:
determine an estimate of an elastic anisotropy parameter for a first portion of an anisotropy formation through which a wellbore is formed, wherein the estimate of the elastic anisotropy parameter includes an estimate of a mud slowness parameter;
receive a first signal comprising a first acoustic waveform received by a well tool positioned in the first portion;
execute a first quality control analysis of the first signal by comparing first data derived from the first signal to a first reference value to determine a difference between the two;
adjust the estimate of the elastic anisotropy parameter for the first portion based on the difference;
receive a second signal comprising a second acoustic waveform received by the well tool positioned in a second portion of the anisotropy formation;
execute a second quality control analysis of the second signal to determine a result, wherein the second quality control analysis is adapted to be performed by a different quality control analysis method than the first quality control analysis;
adjust the estimate of the elastic anisotropy parameter for the first portion based on the result.

10. The non-transitory computer-readable medium of claim 9, wherein the first portion comprises a plurality of portions based on depth, and wherein the instructions for causing the processing device to execute the first quality control analysis by performing an acquisition-scale analysis of a respective estimate of the elastic anisotropy parameter determined for each portion of the plurality of portions.

11. The non-transitory computer-readable medium of claim 10, wherein the instructions for causing the processing device to execute the second quality control analysis by performing a log-scale analysis of the second signal based on the respective estimate of the elastic anisotropy parameter for each portion of the plurality of portions.

12. The non-transitory computer-readable medium of claim 9, wherein the instructions for causing the processing device to identify as the first portion of the anisotropic formation a section of the wellbore having stable sidewall conditions, wherein the estimate of the elastic anisotropy parameter is determined for the section.

13. The non-transitory computer-readable medium of claim 9, wherein the instructions further cause the processing device to store the estimate of the elastic anisotropy parameter for the first portion in response to adjusting the estimate of the elastic anisotropy parameter such that the processing device can more accurately extract data from subsequent signals having propagated through the first portion using the estimate of the elastic anisotropy parameter for the first portion.

14. The non-transitory computer-readable medium of claim 9, wherein the instructions for causing the processing device to:
determine that the first data derived from the first signal is more than a threshold amount from the first reference value; and
calculate an adjustment to the estimate of the elastic anisotropy parameter for the first portion such that second data extractable from the second signal is closer to a second reference value.

15. A system comprising:
a well tool positionable in a first segment of a wellbore formed through a first portion of an anisotropic formation for receiving a first signal comprising an acoustic waveform received at the well tool and representing an elastic anisotropy parameter for the first portion, wherein the well tool is further positionable in a second segment of the wellbore formed through a second portion of the anisotropic formation for receiving a second signal representing elastic anisotropy parameters for the first portion and the second portion;
a processing device communicatively coupleable to the well tool for:
determining an estimate of the elastic anisotropy parameter for the first portion of the anisotropic formation, wherein the elastic anisotropy parameter includes a mud slowness parameter;
executing a first quality control analysis of the first signal by comparing first data derived from the first signal to a first reference value to determine a difference between the two;
adjusting the estimate of the elastic anisotropy parameter for the first portion based on the difference;
executing a second quality control analysis of the second signal to determine a result, wherein the second quality control analysis is adapted to be performed by a different quality control analysis method than the first quality control analysis;
adjusting the estimate of the elastic anisotropy parameter for the first portion based on the result.

16. The system of claim 15, wherein the well tool is positionable at a plurality of depths in the wellbore for receiving a signal at each depth of the plurality of depths, wherein the processing device is communicatively coupleable to the well tool for adjusting a respective estimate of the elastic anisotropy parameter for each depth of the plurality of depths based on an acquisition-scale analysis of the signal at each depth of the plurality of depths, wherein the processing device is communicatively coupleable to the well tool for adjusting the respective estimate of the elastic anisotropy parameter for each depth of the plurality of depths based on a log-scale analysis of another signal representing the elastic anisotropy parameter for each depth of the plurality of depths.

17. The system of claim 15, wherein the well tool is coupleable to a drill positionable in the wellbore, wherein the processing device is communicatively coupleable to the well tool for adjusting the estimate in substantially real time as part of a logging-while-drilling operation.

18. The system of claim 15, wherein the processing device is communicatively coupleable to the well tool for adjusting vertical propagating shear wave slowness estimates, the mud slowness parameter estimates, and Thomsen anisotropy estimates.

19. The system of claim 15, wherein the well tool is positionable in the wellbore for performing seismic imaging of the anisotropic formation, wherein the processing device is communicatively coupleable to the well tool for improving an accuracy of the seismic imaging by improving an accuracy of the estimate of the elastic anisotropy parameter for the first portion.

20. The system of claim 15, further comprising a memory for storing the estimate of the elastic anisotropy parameter for the first portion, wherein the processing device is communicatively coupleable to the memory for updating the estimate of the elastic anisotropy parameter for the first portion.

* * * * *